US008020877B2

(12) United States Patent
Lang

(10) Patent No.: US 8,020,877 B2
(45) Date of Patent: Sep. 20, 2011

(54) SELF-CENTERING CHUCK

(75) Inventor: Günter Lang, Wernau (DE)

(73) Assignee: Lang Technik GmbH, Neuhausen (DE)

( * ) Notice: Subject to any disclaimer, the term of this patent is extended or adjusted under 35 U.S.C. 154(b) by 894 days.

(21) Appl. No.: 12/014,236

(22) Filed: Jan. 15, 2008

(65) Prior Publication Data

US 2008/0174077 A1 Jul. 24, 2008

(30) Foreign Application Priority Data

Jan. 18, 2007 (DE) ......................... 10 2007 003 673

(51) Int. Cl.
*B23B 31/16* (2006.01)

(52) U.S. Cl. ........................................ 279/112; 279/123

(58) Field of Classification Search .................. 279/112, 279/110, 124, 123, 114
See application file for complete search history.

(56) References Cited

U.S. PATENT DOCUMENTS 4,429,887 A * 2/1984 Smith ........................... 279/112
4,534,574 A * 8/1985 Hesh et al. .................... 279/112
4,960,285 A * 10/1990 Doi ............................... 279/123

FOREIGN PATENT DOCUMENTS

DE 28 39 320 A1 3/1970
DE 41 06 663 9/1992
DE 195 48 978 A1 8/1996
DE 202 11 275 9/1996
DE 1 213 095 6/2002
EP 0 742 081 A2 11/1996

OTHER PUBLICATIONS

EPO website machine translation of EP 0742081 A2, detailed description section, translation performed Dec. 17, 2010.*

* cited by examiner

*Primary Examiner* — Eric A Gates
*Assistant Examiner* — Bayan Salone
(74) *Attorney, Agent, or Firm* — McGlew and Tuttle, P.C.

(57) ABSTRACT

A self-centering chuck is provided for accurately fixing the position of workpieces on tables. The chuck has a basic body with guide grooves, a threaded spindle with right-handed and left-handed external threads and a centrally arranged groove, two slides screwed onto an external thread each with a clamping jaw each in the head area and with sliding blocks in the foot area. The slides are guided axially in the guide grooves and on the threaded spindle. The threaded spindle is centered in a central piece and can be fixed and locked on the basic body and on the central piece by fastening means guided in the groove. The clamping jaws arranged on the head side on the slides have clamping surfaces on both sides and can be used on both sides. The slides can be screwed on both sides onto left-handed and right-handed external threads of the threaded spindle.

8 Claims, 3 Drawing Sheets

SELF-CENTERING CHUCK

CROSS REFERENCE TO RELATED APPLICATIONS

This application claims the benefit of priority under 35 U.S.C. §119 of German Patent Application DE 10 2007 003 673.8 filed Jan. 18, 2007, the entire contents of which are incorporated herein by reference.

FIELD OF THE INVENTION

The present invention pertains to a self-centering chuck for accurately fixing the position of workpieces on tables.

BACKGROUND OF THE INVENTION

Self-centering chucks are known, which comprise a basic body consisting of a steel casting with guide grooves, a threaded spindle, which is mounted rotatably about its longitudinal axis and has a right-handed external thread in a first axial area and a left-handed external thread in a second axial area and is provided centrally with a groove surrounding the circumference of the threaded spindle, two slides screwed onto an external thread each of the threaded spindle with a clamping jaw each arranged in the head area, which are guided movably in the axial direction with sliding blocks screwed onto the slides in the guide grooves of the basic body and on the threaded spindle, wherein the threaded spindle is centered in a central piece, which is arranged between the slides and against which the two slides are to be clamped, and can be fixed and locked at the basic body and at the central piece by fastening means guided in the groove, so that rotation of the threaded spindle leads to an axial motion of the slides with the clamping jaws towards or away from each other.

One problem of the self-centering chucks of the class described is that the clamping jaws made integrally in one piece with the top side have only one clamping surface each suitable for clamping only. Only two clamping jaws arranged opposite each other with their clamping surface are suitable for fixing the position of workpieces. The outer surfaces of the clamping jaws have predominantly a material-saving shape, but they have no functional significance. Based on this, the clamping path between the clamping jaws remains very limited. Furthermore, the slides are equipped each only with a right-handed or left-handed thread, and they can therefore be screwed only onto the right-handed or left-handed thread of the spindle. In addition, the sliding blocks screwed to the slides may become loose and tilt, which requires time-consuming and labor-intensive maintenance in view of the required precision.

SUMMARY OF THE INVENTION

The object of the present invention was therefore to provide a self-centering chuck for accurately fixing the position of workpieces to be machined on tables, which self-centering chuck guarantees expanded clamping paths, higher stability for guiding the slides and against twisting of the slides, a substantially reduced weight and less complicated logistics.

According to the invention, a self-centering chuck is provided for accurately fixing the position of workpieces to be machined on tables. The self-centering chuck comprises a basic body with guide grooves as well as a threaded spindle mounted rotatably about a longitudinal axis thereof. The threaded spindle has a right-handed external thread in a first axial area and a left-handed external thread in a second axial area. The threaded spindle is provided centrally with a circumferential groove extending around a circumference of the threaded spindle. A first slide is screwed onto the right-handed external thread of the threaded spindle. The first slide includes a clamping jaw in a head area. The first slide has sliding blocks guided in the guide grooves of the basic body and guided movably in an axial direction on the threaded spindle. A second slide is screwed onto the left-handed external thread of the threaded spindle. The second slide includes a clamping jaw in a head area. The second slide has sliding blocks guided in the guide grooves of the basic body and guided movably in an axial direction on the threaded spindle. A central piece is arranged between the slides. The two slides are clamped against this central piece. The threaded spindle is centered by the central piece and is fixed on the basic body by a fastening means of the central piece wherein the fastening means is guided in the groove so that rotation of the threaded spindle leads to an axial motion of the slides with the clamping jaws towards each other and away from one another. The clamping jaws that are arranged on the slides on the head side have clamping surfaces on both sides and can be used on both sides, and the slides can be screwed on both sides onto the left-handed and right-handed external threads of the threaded spindle.

The design of the clamping jaws, which can be used on both sides, as a result of which a considerable expansion of the clamping width is guaranteed for workpieces to be machined, shall be emphasized in particular. The clamping jaws, which are to be provided according to another variation, has different contours, support surfaces and auxiliary stops, to support not only their usability on both sides, but they also expand the versatility of their use.

Another great advantage is the embodiment of the slides, which can be screwed onto the threaded spindle on both sides independently from the thread being right-handed or left-handed, as a result of which their use becomes more flexible. This advantage is achieved, according by the arrangement of right-handed and left-handed internal threads in each slide, as a result of which the slides can be rotated by 180° only and can again be screwed onto the spindle.

The sliding blocks, which may be made integrally in one piece on both sides at the foot area of the slides may have a working surface extending above and below the guide groove. This feature is such that the slides acquire a greater stability concerning their guiding in the guide grooves of the basic body. In particular, the one-piece design eliminates the problem of loosening of the screwed-on sliding blocks and hence the risk of tilting in the guide grooves of the basic body. Furthermore, larger guiding and working surfaces are obtained due to the shape of the sliding grooves made integrally in one piece, the advantageous effect of such larger surfaces being that the forces acting on the slides are better distributed on the basic body. This brings about a considerable reduction of the load on the material and of the wear of the material on the basic body. As a consequence of this favorable effect, it is possible to manufacture the basic bodies from lighter materials, for example, aluminum or plastic, which in turn leads to a considerable weight reduction of the self-centering chucks. This favorable effect implies, moreover, more far-reaching advantages in terms of the storage and the transportation of self-centering chucks. The considerable weight reduction of these self-centering chucks makes it possible to use storage and transportation technology with lower load-bearing capacity and consequently to reduce the amount of materials used and the costs in the area of logistics.

The present invention shall be described in more detail below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
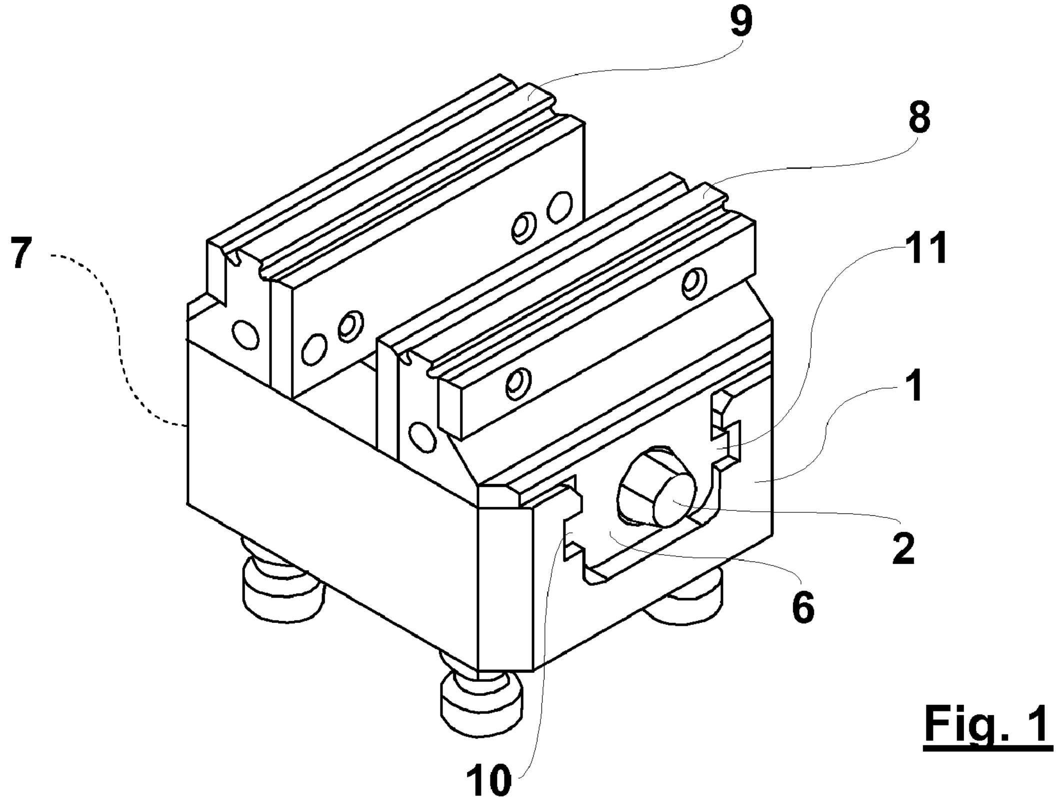
FIG. 1 is a perspective view of the self-centering chuck with sliding blocks made integrally in one piece.
Figure 2:
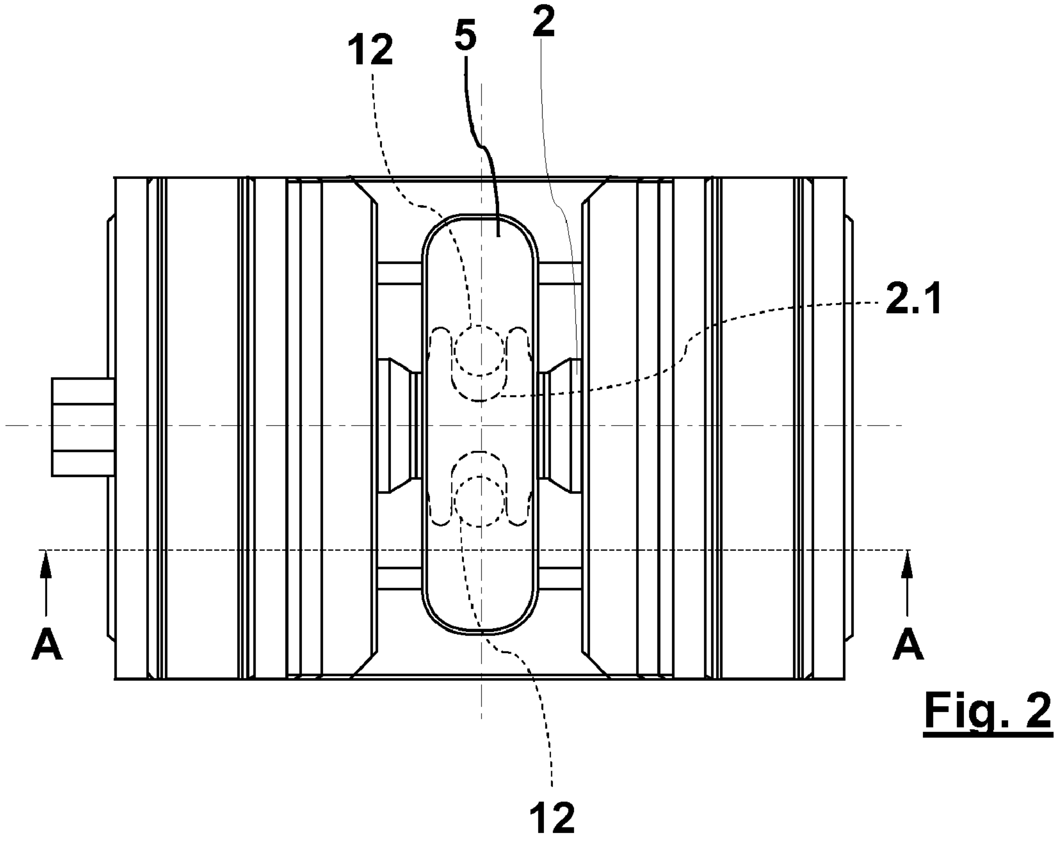
FIG. 2 is a top view of a self-centering chuck of FIG. 1.
Figure 3:
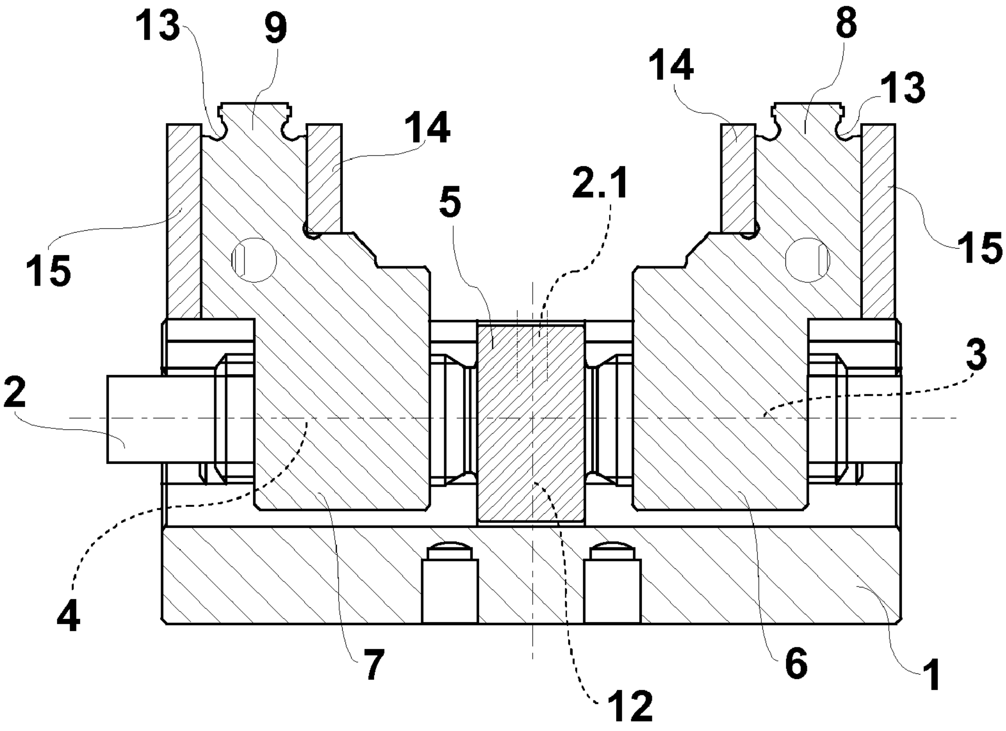
FIG. 3 is a sectional view along line A-A from FIG. 2.
Figure 4:
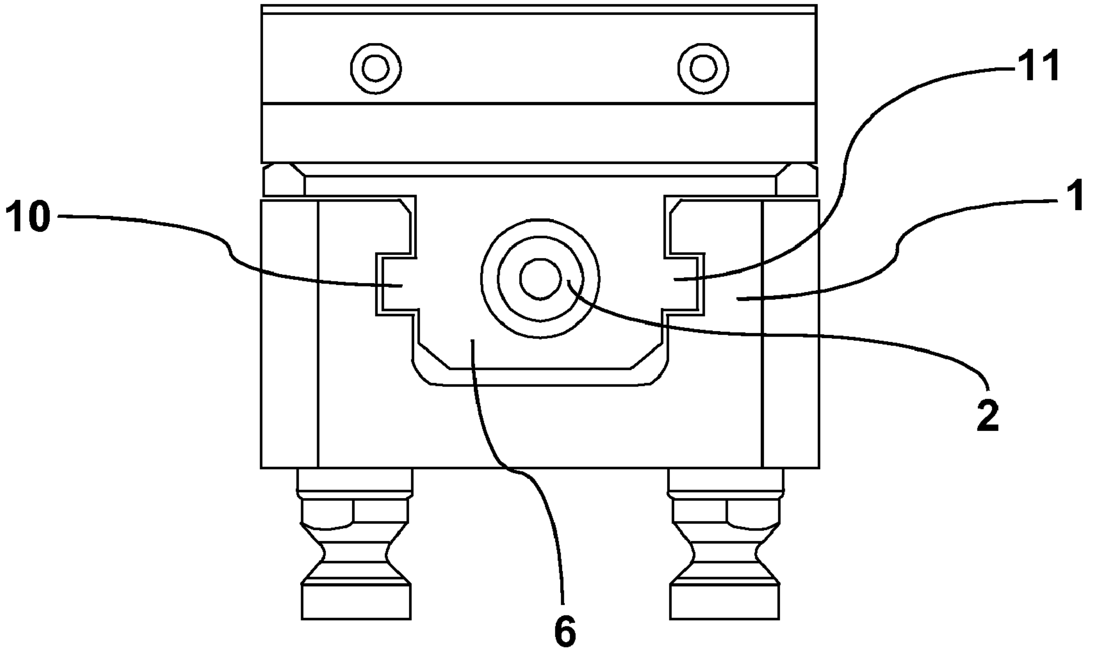
FIG. 4 is a front view of the self-centering chuck with sliding blocks made integrally in one piece.
Figure 5:
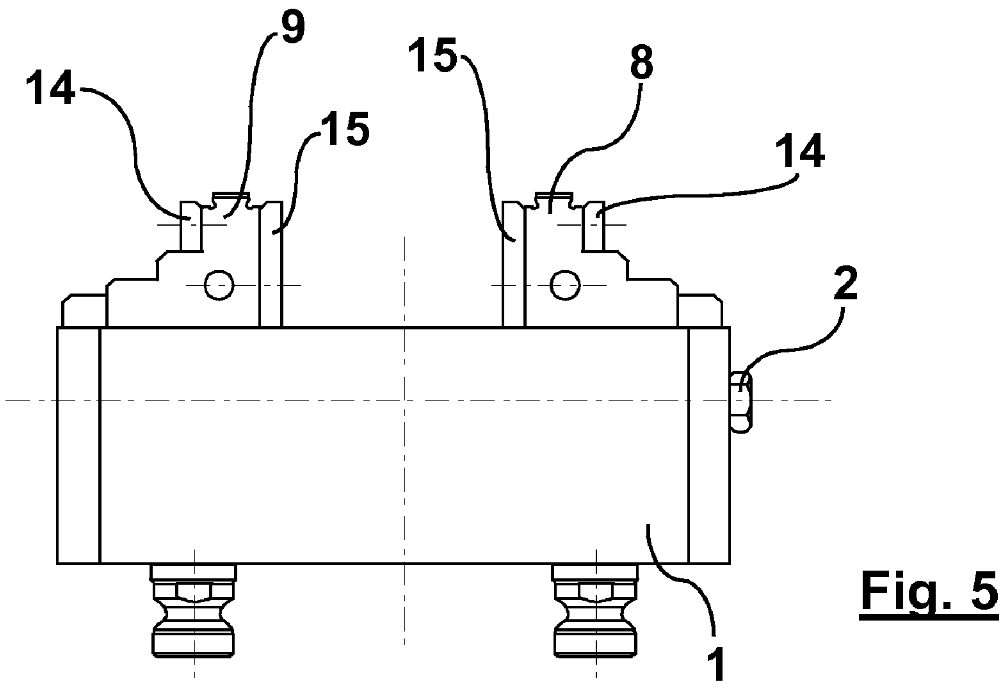
FIG. 5 is a side view of the self-centering chuck with narrow clamping width.
Figure 6:
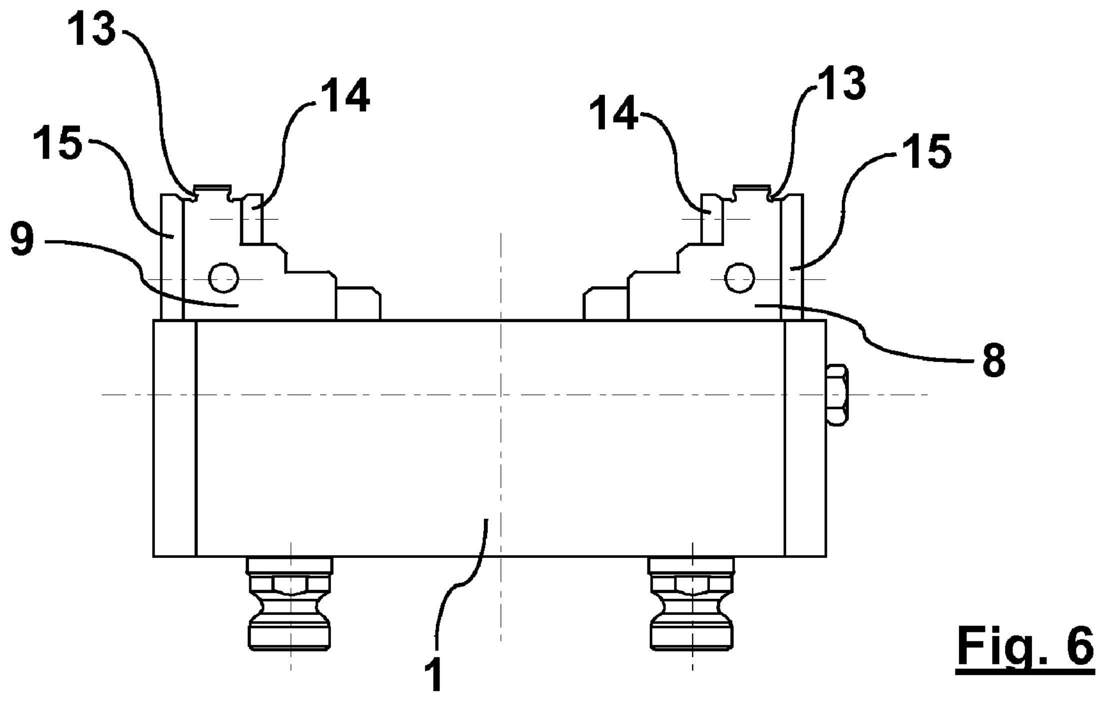
FIG. 6 is a side view of the self-centering chuck with rotated clamping jaws and expanded clamping width.

Referring to the drawings in particular, the exemplary embodiment shown in FIG. 1 is a self-centering chuck with a basic body 1, for example, one made of aluminum, in which two sliding blocks extending in parallel in the axial direction are arranged. Preferably two slides 6, 7 are provided in the head area with clamping jaws 8, 9 made integrally in one piece, which are provided, according to FIG. 3, for example, with special contours 13, and one side of which has a support surface 14 each and the opposite side of which has an auxiliary stop 15 each. A threaded spindle 2 is provided, according to FIG. 2 and FIG. 3, with a groove 2.1, which is made integrally in one piece between two external threads 3 and 4 and surrounds the circumference of the threaded spindle 2. The threaded spindle 2 can be fixed and locked on the basic body 1 by means of the groove 2.1 with preferably two fastening means 12 arranged opposite each other and is centered via a central piece 5 arranged centrally at the basic body 1. With the fastening means 12, the threaded spindle 1 can be adjusted on a table in a horizontal plane in different directions, for example, during the setting up of a plurality of self-centering chucks arranged one after another or next to each other on a table. According to FIG. 4, sliding blocks 10, 11 are made integrally in one piece on both sides according to the present invention in the foot area at the slides 6, 7. The slides 6, 7 are equipped with a left-handed and right-handed internal thread, which are known per se and are not shown in detail in the drawings, and they are screwed onto the right-handed external thread 3 and the left-handed external thread 4 of the threaded spindle 2, such that the clamping jaws 8, 9 according to the present invention are arranged opposite, for example, with their contact surfaces 14, as a result of which a broader clamping width is available. If the smaller clamping width of the self-centering chuck is needed, the slides 6, 7 with their clamping jaws 8, 9 are rotated by 180 degrees each and screwed again onto the same side of the threaded spindle 2. The smaller clamping width is now available. The slides 6, 7 with the sliding blocks 10, 11 made integrally in one piece in the foot area are guided axially together with the threaded spindle 2 in the guide grooves of the basic body 1, and the sliding blocks 10, 11 made integrally in one piece have a working and guiding surface, which extend above and below the guide grooves of the basic body 1. FIGS. 5 and 6 show a side view of a self-centering chuck with the clamping jaws 8, 9 according to the present invention, which can be used on both sides, FIG. 5 showing a clamping width known from the state of the art and FIG. 6 showing a clamping width expanded according to the present invention. The contours 13 of the clamping jaws 8, 9 may, of course, have a great variety of shapes as needed. This also applies to support surfaces 14 or auxiliary stops 15, which are to be arranged additionally.

While specific embodiments of the invention have been shown and described in detail to illustrate the application of the principles of the invention, it will be understood that the invention may be embodied otherwise without departing from such principles.

What is claimed is:

1. A self-centering chuck for accurately fixing the position of workpieces to be machined on tables, the self-centering chuck comprising:

a basic body with guide grooves;

a threaded spindle mounted rotatably about a longitudinal axis thereof, said threaded spindle having a right-handed external thread in a first axial area and a left-handed external thread in a second axial area, said threaded spindle being provided centrally with a circumferential groove extending around a circumference of said threaded spindle;

a first slide screwed onto said right-handed external thread of said threaded spindle, said first slide including a clamping jaw in a head area, said first slide having sliding blocks guided in said guide grooves of said basic body and guided movably in an axial direction on said threaded spindle;

a second slide screwed onto said left-handed external thread of said threaded spindle, said second slide including a clamping jaw in a head area, said second slide having sliding blocks guided in said guide grooves of said basic body and guided movably in an axial direction on said threaded spindle;

a central piece arranged between said slides and against which said two slides are clamped, said threaded spindle being centered by said central piece and being fixed on said basic body by a fastening means of said central piece wherein said fastening means is guided in said groove so that rotation of said threaded spindle leads to an axial motion of said slides with said clamping jaws towards each other and away from one another, characterized in that said clamping jaws arranged on said slides on the head side have clamping surfaces on both sides for use on both sides, and said slides are screwed on both sides onto said left-handed and right-handed external threads of said threaded spindle, each of said slides having a left-handed internal thread and a right-handed internal thread, with which they can be screwed onto said threaded spindle by a 180 degree rotation from both sides.

2. A self-centering chuck in accordance with claim 1, wherein said clamping surfaces arranged on both sides at said clamping jaws are provided with different contours, in the form of contact surfaces and auxiliary stops.

3. A self-centering chuck in accordance with claim 1, wherein said sliding blocks are made integrally in one piece with said slides.

4. A self-centering chuck in accordance with claim 1, wherein said sliding blocks have working surfaces, which extend above and below said guide grooves on said basic body.

5. A self-centering chuck in accordance with claim 1, wherein the material of said basic body is steel, aluminum or plastic.

6. A self-centering chuck for fixing a position of a workpiece, the self-centering chuck comprising:

a body defining a plurality of guide grooves;

a threaded spindle mounted rotatably in said body and rotatable about a longitudinal axis of said threaded spindle, said threaded spindle having a right-handed external thread in a first axial area and a left-handed external thread in a second axial area, said threaded spindle defining a circumferential groove between said first and second axial areas, said circumferential groove extending around a circumference of said threaded spindle;

a first slide defining a right-handed internal thread and a left-handed internal thread, said first slide being rotatably mountable on either one of said right-handed external thread and said left-handed external thread of said threaded spindle in a plurality of angular positions, said first slide including a head area with a plurality of clamping jaws arranged on diametrically opposite sides of said head area, said first slide having a plurality of sliding blocks guided in said plurality of guide grooves of said body, said threads, said guide grooves and said sliding blocks guiding said first slide movably in said body in an axial direction of said threaded spindle;

a second slide defining aright-handed internal thread and a left-handed internal thread, said second slide being rotatably mountable on either one of said right-handed external thread and said left-handed external thread of said threaded spindle in a plurality of angular positions, said second slide including a head area with a plurality of clamping jaws arranged on diametrically opposite sides of said head area, said second slide having a plurality of sliding blocks guided in said plurality of guide grooves of said body, said threads, said guide grooves and said sliding blocks guiding said second slide movably in said body in an axial direction of said threaded spindle;

a central piece mounted on said body and rotatably connected to said circumferential groove of said threaded spindle to have rotation of said threaded spindle leads cause an axial motion of said slides with said clamping jaws towards each other and away from one another.

7. A self-centering chuck in accordance with claim 6, wherein:

said first and second slides have opposite ends;

each of said first and second slides are screwable onto either end of said threaded spindle starting with either of said opposite ends.

8. A self-centering chuck in accordance with claim 6, wherein:

said plurality of angular positions are spaced from each other by 180° about an axis perpendicular to said longitudinal axis of said threaded spindle.

* * * * *